United States Patent
Naritomi

(10) Patent No.: US 6,244,236 B1
(45) Date of Patent: Jun. 12, 2001

(54) BALANCER SYSTEM FOR POWER PLANT

(75) Inventor: Tadakazu Naritomi, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/339,123

(22) Filed: Jun. 24, 1999

(30) Foreign Application Priority Data

Jun. 25, 1998 (JP) .................................................. 10-178717

(51) Int. Cl.$^7$ ....................................................... F02B 75/06
(52) U.S. Cl. ........................................................... 123/192.2
(58) Field of Search .......................................... 123/192.2

(56) References Cited

U.S. PATENT DOCUMENTS 4,802,450 * 2/1989 Roberts ............................. 123/192.2

FOREIGN PATENT DOCUMENTS 5-172187   7/1993 (JP) .

* cited by examiner

Primary Examiner—Noah P. Kamen
(74) Attorney, Agent, or Firm—Foley & Lardner

(57) ABSTRACT

A balancer system for a power plant including a transversely mounted engine having an engine mount section located at a first side in a direction of an axis of an crankshaft, the engine being supported through the engine mount to a vehicle body on which the power plant is mounted. A transmission is fastened to the engine at a second side opposite to the first side in the direction of the axis of the crankshaft. The balancer system comprises a balance shaft which is rotatably installed to the engine. In the above balancer system, a first distance between center of gravity of the power plant and center of inertia force generated by the engine is smaller than a second distance between center of gravity of the power plant and center of inertia force generated by the balance shaft, each of the first and second distances being on a plane containing the axis of the crankshaft. Additionally, an inertia force ($F_B$) generated by the balance shaft is given by the following equation:

$$F_B = [(I + m \cdot L_1 \cdot L_3)/(I + m \cdot L_2 \cdot L_3)] \cdot F$$

where F is an inertia force generated by the engine; $L_1$ is the first distance; $L_2$ is the second distance; $L_3$ is a third distance (on the plane) between the center of gravity of the power plant and the support center of the engine mount section; I is a moment of inertia of the power plant; and m is a mass of the power plant.

9 Claims, 4 Drawing Sheets

BALANCER SYSTEM FOR POWER PLANT

BACKGROUND OF THE INVENTION

This invention relates to improvements in a balancer system for a power plant including a reciprocating engine, having a balance shaft for reducing vibration generated under the action of a reciprocating inertia mass.

Hitherto a variety of balancer systems for reciprocating engines have been proposed and put into practical use, in which a balance shaft or balance shafts are rotatably installed to the engine which is combined with a transmission to constitute a power plant. One of them is disclosed in Japanese Patent Provisional Publication No. 5-172187. In this conventional balancer system, a distance ($L_F$) between the center of gravity of the power plant and the center of inertia force generated by the engine is smaller than a distance ($L_X$) between the center of gravity of the power plant and the center of inertia force generated by the balance shaft, on a plane containing the axis of a crankshaft of the engine. This is intended to balance moments due to the both inertia forces and acting around the center of gravity of the power plant.

BRIEF SUMMARY OF THE INVENTION

In connection with the above conventional balancer system, a pitching moment $M_E$ around the center of gravity of the power plant under the action of the inertia force F generated by the engine is given by an equation $M_E = FL_F$. A pitching moment $M_B$ around the center of the gravity of the power plant under the action of the inertia force $F_X$ generated by the balance shaft is given by an equation $M_B = F_X L_X$. In order to cancel the pitching moments under the two inertia forces, the relationship $FL_F = F_X L_X$ is to be established.

Here, the relationship $F_X < F$ can be established by employing the relationship $L_X > L_F$.

Accordingly, the weight of the balance shaft can be reduced from a conventionally required weight corresponding to F to a weight corresponding to Fx smaller than F, without accompanying generation of a pitching moment.

However, with the above conventional balancer system, generation of pitching moment of the power plant may be suppressed; however, vertical rectilinear force ($F - F_X$) remains in the power plant and therefore the following problems arise:

This rectilinear force is calculated as follows: Since the relationship $FL_F = F_X L_X$ is established, the relationship $F_X = F(L_F/L_X)$ is made. From this, the relationship $F - F_X = [1-(L_F/L_X)]$ F is established.

Under the action of the remaining rectilinear force, generation of vertical vibration at an engine mount section (through which the engine is installed to a vehicle body) cannot be sufficiently suppressed, for example, in a transversely mounted engine of a front engine front wheel drive type automotive vehicle. The engine mount section is located at one end side of the engine in a direction of axis of a crankshaft. Therefore, it is impossible to reduce booming (reverberation) noise within a passenger compartment of the automotive vehicle.

In connection with booming noise within the passenger compartment, experiments have been conducted to obtain a result represented as a graph shown in FIG. 4, using a transversely mounted engine (having a displacement of 2000 cc) of a front engine front wheel drive type automotive vehicle. The graph in FIG. 4 depicts contribution (rates) to the booming noise within the passenger compartment by a plurality of input sources. The input sources include exhaust noise S1, intake noise S2, the engine mount section S3 at the front end section of the engine, and other engine mount sections S4. This graph depicts that the engine mount section S3 at the front end section of the engine has the highest contribution (51%) to the booming noise within the passenger compartment. Accordingly, it is impossible to reduce the booming noise within the passenger compartment if suppression is not made on vertical vibration caused by the rectilinear force at the engine mount section set at the front end section of the engine.

In view of the above, it is an object of the present invention to provide an improved balancer system which can effectively overcome drawbacks encountered in conventional balancer systems for power plants.

Another object of the present invention is to provide an improved balancer system for a power plant, which can effectively reduce booming noise within a passenger compartment in a vehicle, while increasing freedom in layout of the power plant in the vehicle.

A further object of the present invention is to provide an improved balancer system for a power plant, which can effectively suppress vibration of a vehicle caused by inertia force at an engine mount section of an engine which mount section is located at one end section in a direction of axis of the crankshaft, while making it possible to reduce the weight of the balance shaft.

A first aspect of the present invention resides in a balancer system for a power plant including a transversely mounted engine having an engine mount section located at a first side in a direction of an axis of an crankshaft, the engine being supported through the engine mount to a vehicle body on which the power plant is mounted, and a transmission fastened to the engine at a second side opposite to the first side in the direction of the axis of the crankshaft. The balancer system comprises a balance shaft which is rotatably installed to the engine. In the balancer system, a first distance between center of gravity of the power plant and center of inertia force generated by the engine is smaller than a second distance between center of gravity of the power plant and center of inertia force generated by the balance shaft, each of the first and second distances being on a plane containing the axis of the crankshaft. Additionally, an inertia force generated by the balance shaft is determined at a value which reduces vibration to a generally zero level at a support center of the engine mount section, the vibration being caused by the inertia force generated by the engine.

A second aspect of the present invention resides in a balancer system for a power plant including a transversely mounted engine having an engine mount section located at a first side in a direction of an axis of an crankshaft, the engine being supported through the engine mount to a vehicle body on which the power plant is mounted, and a transmission fastened to the engine at a second side opposite to the first side in the direction of the axis of the crankshaft. The balancer system comprises a balance shaft which is rotatably installed to the engine. In the balancer system, a first distance between center of gravity of the power plant and center of inertia force generated by the engine is smaller than a second distance between center of gravity of the power plant and center of inertia force generated by the balance shaft, each of the first and second distances being on a plane containing the axis of the crankshaft. Additionally, an inertia force ($F_B$) generated by the balance shaft is given by the following equation:

$$F_B = [(I + m \cdot L_1 \cdot L_3)/(I + m \cdot L_2 \cdot L_3)] \cdot F$$

where F is an inertia force generated by the engine; $L_1$ is the first distance; $L_2$ is the second distance; $L_3$ is a third distance (on the plane) between the center of gravity of the power plant and a support center of the engine mount section; I is a moment of inertia of the power plant; and m is a mass of the power plant.

A third aspect of the present invention resides in a power plant for an automotive vehicle. The power plant comprises a transversely mounted engine having an engine mount section located at a first side in a direction of an axis of an crankshaft, the engine being supported through the engine mount to a vehicle body on which the power plant is mounted. A transmission is fastened to the engine at a second side opposite to the first side in the direction of the axis of the crankshaft. Two balance shaft are rotatably installed to the engine, the two balance shafts being located on opposite sides of a plane containing the axis of the crankshaft. In the power plant, a first distance between center of gravity of the power plant and center of inertia force generated by the engine is smaller than a second distance between center of gravity of the power plant and center of inertia force generated by the balance shafts, each of the first and second distances being on the plane containing the axis of the crankshaft. Additionally, an inertia force generated by the balance shaft is determined at a value which reduces vibration to a generally zero level at a support center of the engine mount section, the vibration being caused by the inertia force generated by the engine. Further, the inertia force ($F_B$) generated by the balance shaft is given by the following equation:

$$F_B = [(I+m \cdot L_1 \cdot L_3)/(I+m \cdot L_2 \cdot L_3)] \cdot F$$

where F is an inertia force generated by the engine; $L_1$ is the first distance; $L_2$ is the second distance; $L_3$ is a third distance (on the plane) between the center of gravity of the power plant and a support center of the engine mount section; I is a moment of inertia of the power plant; and m is a mass of the power plant.

A fourth aspect of the present invention resides in a method of reducing vibration of a power plant including a transversely mounted engine having an engine mount section located at a first side in a direction of an axis of an crankshaft, the engine being supported through the engine mount to a vehicle body on which the power plant is mounted, and a transmission fastened to the engine at a second side opposite to the first side in the direction of the axis of the crankshaft. The method comprises (a) installing a balance shaft to be rotatable, to the engine; (b) setting a first distance between center of gravity of the power plant and center of inertia force generated by the engine at value smaller than a second distance between center of gravity of the power plant and center of inertia force generated by the balance shaft, each of the first and second distances being on a plane containing the axis of the crankshaft; and (c) determining an inertia force generated by the balance shaft at a value which reduces vibration to a generally zero level at a support center of the engine mount section, the vibration being caused by the inertia force generated by the engine.

DETAILED DESCRIPTION OF THE INVENTION

Figure 1:
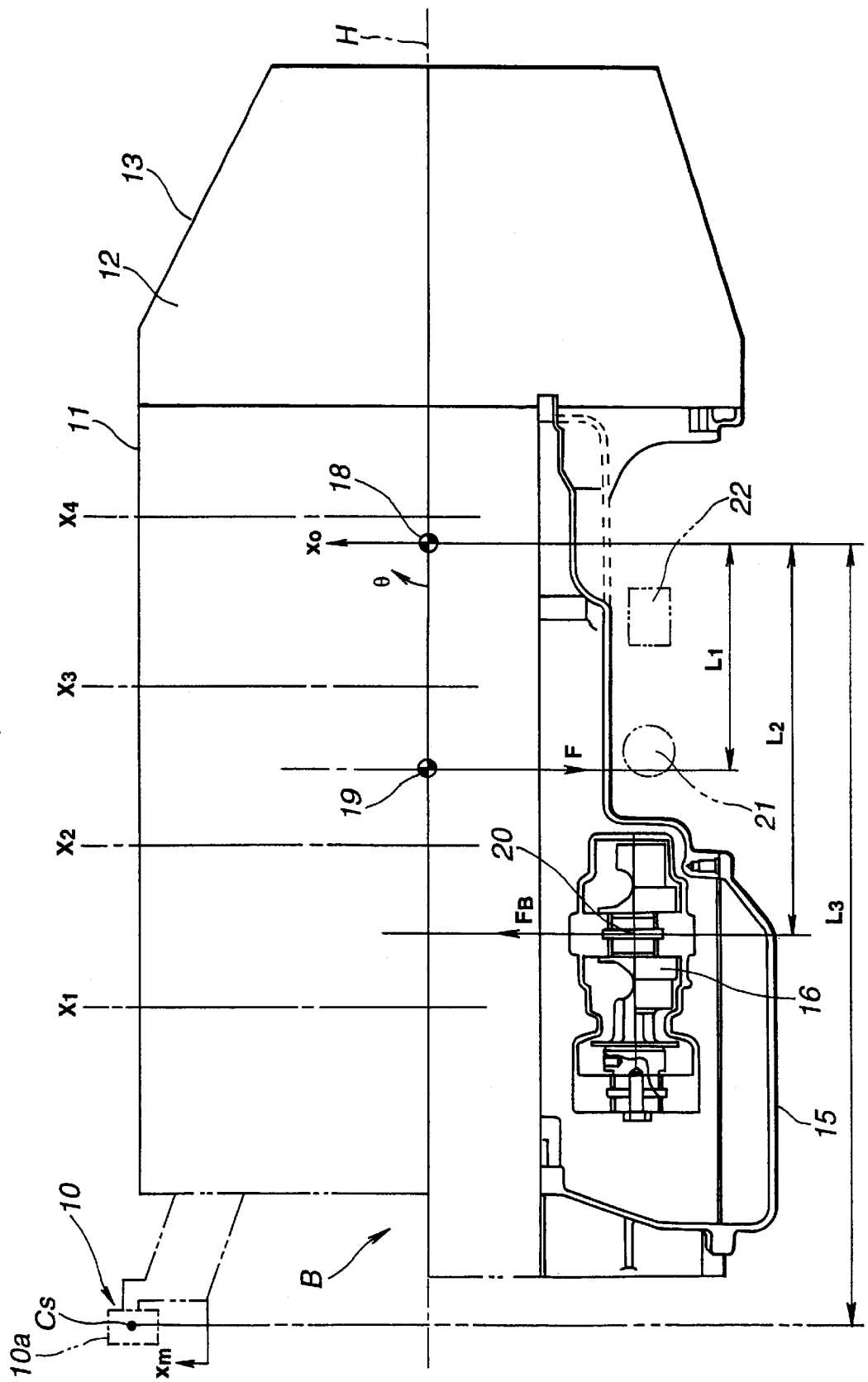
FIG. 1 is a schematic front view, partly in section, of an embodiment of a balancer system according to the present invention.
Figure 2:
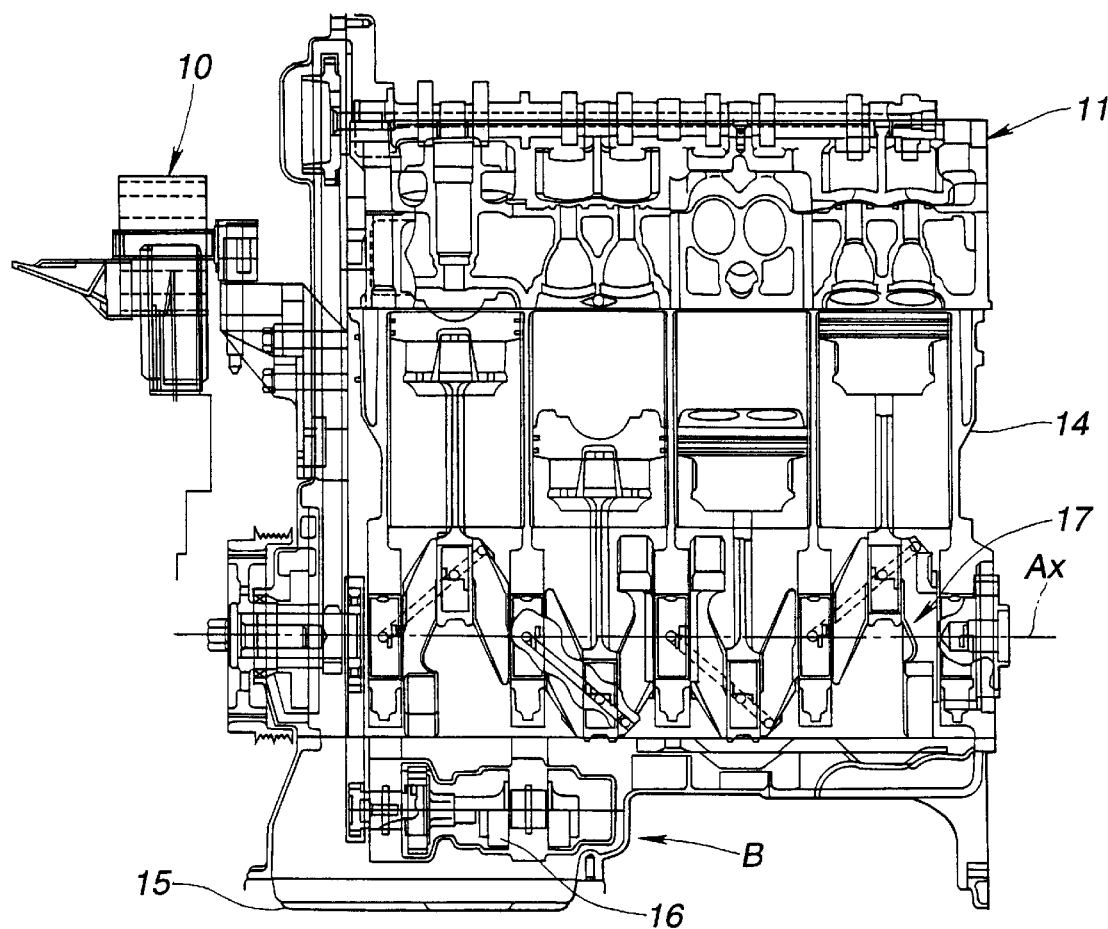
FIG. 2 is a vertical sectional view of an engine of the balancer system of FIG. 1.

Referring now to FIGS. 1 and 2 of the drawings, an embodiment of a balancer system for a power plant, according to the present invention is illustrated by the reference character B. In this embodiment, the power plant 13 includes a transversely mounted in-line four-cylinder engine 11 whose axial one side or front end section is provided with an engine mount section 10 through which the engine 11 is supported on a member (not identified) of a vehicle body. The transversely mounted engine is mounted on the vehicle body in such a manner that the axis Ax of a crankshaft 17 thereof extends transversely or perpendicularly to a longitudinal axis (not shown) of the vehicle. A transaxle 12 is installed to the axial other side or rear end section of the engine 11 so as to constitute the power plant 13. The transaxle 12 includes a transmission (not identified) and an axle assembly (not identified) which are combined with each other.

Figure 3:
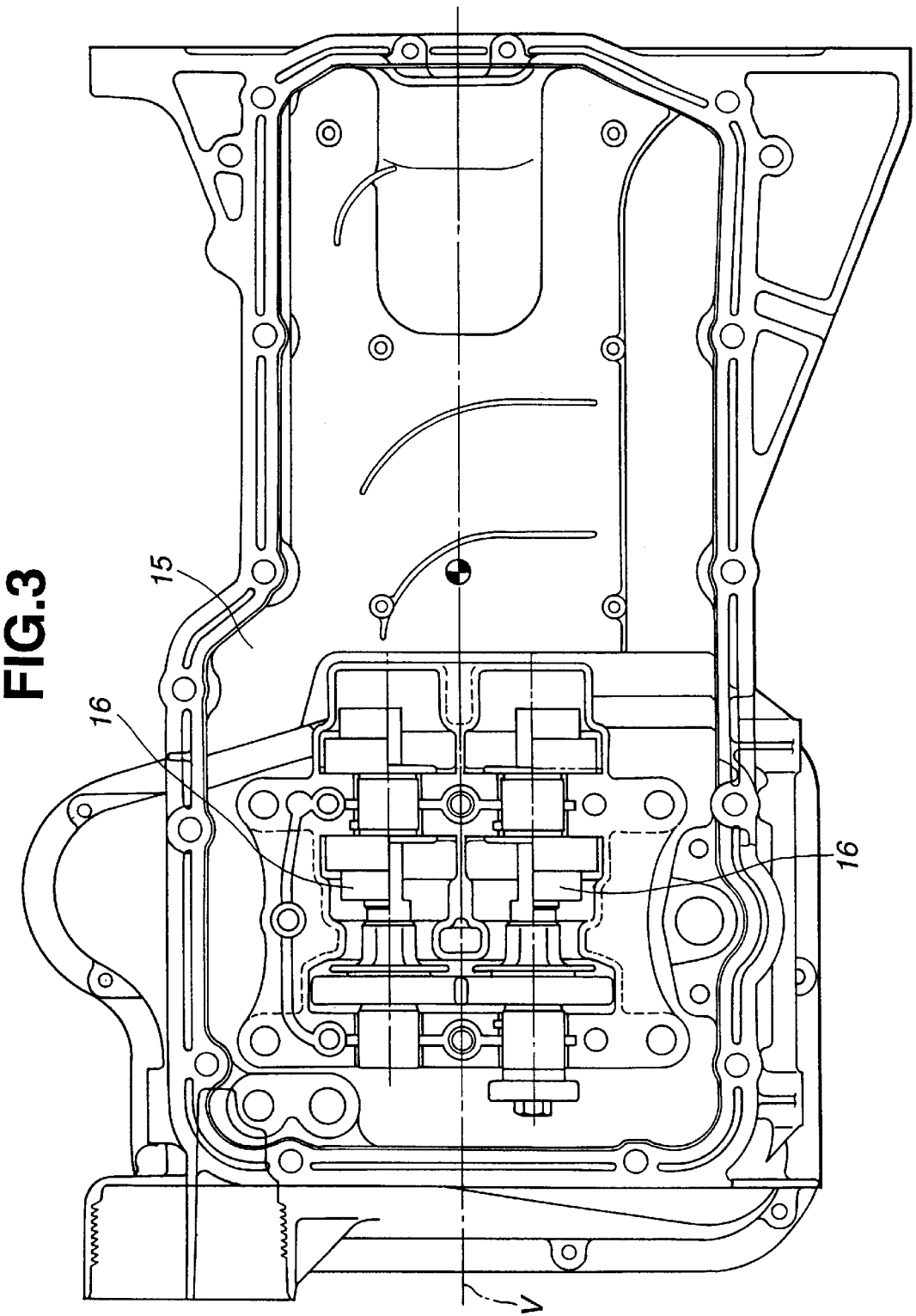
FIG. 3 is a plan view of an oil pan of the engine of FIG. 2, showing two balance shafts disposed inside the oil pan.
Figure 4:
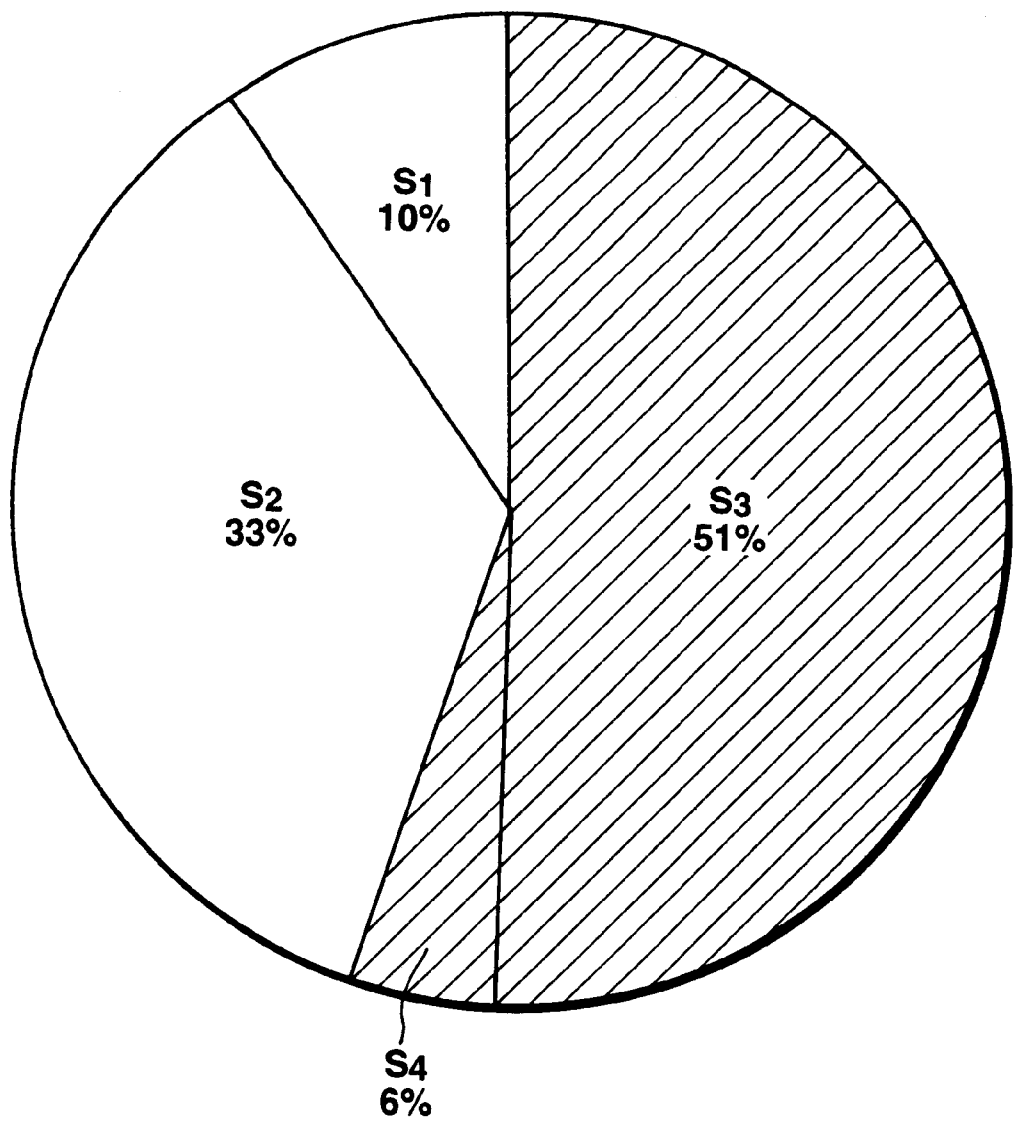
FIG. 4 is a graph showing experimental results, explaining contribution of vibrations to booming noise within a passenger compartment of a vehicle on which the balancer system is mounted.

The engine 11 has a cylinder block 14 provided with four cylinders whose axes are indicated as $X_1$, $X_2$, $X_3$ and $X_4$ in FIG. 1. An oil pan 15 is connected to the bottom section of the cylinder block 14. Two balance shafts 16 are disposed inside the oil pan 15 and located below the crankshaft 17 and on the opposite sides of an imaginary vertical plane V containing the axis Ax of the crankshaft 17 in such a manner as to be positioned generally symmetrical with each other with respect to the plane V, as shown in FIG. 3. Pistons (not identified) are connected through connecting rods (not identified) to the crankshaft 17. Each balance shaft 16 extends parallel with the axis Ax of the crankshaft 17. Each balance shaft 16 is rotated in synchronism with or in timed relation to rotation of the crankshaft 17 and forms part of the balancer system B. The two balance shafts 16 are rotated respectively in opposite directions to each other. Accordingly, the two balance shafts 16 can reduce vibration generated under reciprocating movement of the mass of a system including the pistons and the connecting rods.

The power plant 13 is arranged such that a first distance $L_1$ between the center 18 of gravity of the power plant 13 and the center 19 of inertia force generated by the engine 11 is smaller than a second distance $L_2$ between the center 18 of gravity of the power plant 13 and the center 20 of inertia force generated by the balance shafts 16, on the imaginary vertical plane V (corresponding to FIG. 1) containing the axis Ax of the crankshaft 17, so that $L_2 > L_1$.

Furthermore, in this power plant 13, the inertia force $F_B$ generated by the balance shafts 16 is given by the following equation:

$$F_B = [(I+m \cdot L_1 \cdot L_3)/(I+m \cdot L_2 \cdot L_3)] \cdot F$$

where F is the inertia force generated by the engine 11; $L_1$ is the first distance between the center of gravity 18 of the power plant 13 and the center 19 of inertia force generated by the engine 11; $L_2$ is the second distance between the center 18 of gravity of the power plant 13 and the center 20 of inertia force generated by the balance shafts 16; $L_3$ is the distance between the center 18 of gravity of the power plant 13 and the support center CS of the engine mount section 10; I is the moment of inertia of the power plant 13; and m is the mass of the power plant 13. The above equation is established on the imaginary vertical plane V corresponding to FIG. 1. In this embodiment, the support center Cs of the engine mount section 10 corresponds to the axial and diametrical center of a cylindrical insulator or mount rubber 10a of the engine mount section 10.

The above equation is derived as follows:

In the equations discussed below, θ is the angular displacement of the power plant 13 about the center 18 of gravity (i.e., the inclination of a horizontal axis H passing through the center 18 of gravity, at a position of the center 18 of the gravity in FIG. 1); $x_0$ is the displacement of the power plant 13 at the center 18 of gravity; $x_m$ is the displacement of the engine mount section 10. The horizontal axis H is parallel with the axis Ax of the crankshaft. The equations are established on the imaginary vertical plane V corresponding to FIG. 1.

First, the following equations (1) to (3) are derived:

$$I \cdot \theta = F_B \cdot L_2 - F \cdot L_1 \quad (1)$$

$$m \cdot \ddot{x}_0 = F_B - F \quad (2)$$

$$\ddot{x}_m = \ddot{x}_0 + L_3 \cdot \theta \text{ (θ is a value which is sufficiently small)} \quad (3)$$

Subsequently, the following equation (5) is derived from the above equations (1) to (3):

$$\ddot{x}_m = [(F_B - F)/m] + [(F_B \cdot L_2 - F \cdot L_1)/I] \cdot L_3 \quad (4)$$

In order to obtain $F_B$ which makes zero vibration at the engine mount section 10, $\ddot{x}_m$ in the above equation (5) is made zero (0). As a result, the following (above) equation is obtained:

$$F_B = [(I + m \cdot L_1 \cdot L_3)/(I + m \cdot L_2 \cdot L_3)] \cdot F \quad (5)$$

Next, effects of the balancer system B according to the present invention will be discussed.

As discussed above, the engine mount section 10 set at the front end section of the engine 11 has the highest contribution (rate) to booming noise within a passenger compartment of the vehicle. Accordingly, it will be understood that booming noise within the passenger compartment can be reduced by suppressing generation of vertical vibration at the engine mount section 10, caused by the inertia force F generated by the engine.

According to the present invention, the inertia force $F_B$ which makes zero vibration at the engine mount section 10 caused by the inertia force F is set by the above equation (5). The balance shafts 16 meeting the equation (5) are used, thereby suppressing generation of vertical vibration at the engine mount section 10, caused by the inertia force F generated by the engine. This can effectively reduce booming noise within the passenger compartment of the vehicle.

Turning to the conventional balancer system discussed in the Background of the Invention, the corresponding inertia force $F_B$ is represented by an equation $F_B = (L_1/L_2) \cdot F$ in the conventional balancer system. If this is substituted into the equation (4), an equation $\ddot{x}_m = \{[F(L_1/L_2) - F]/m\} + [(FL_1 - FL_1)/I] \cdot L_3$ is obtained. From this, an equation $\ddot{x}_m = [(L_1 - L_2)/mL_2] \cdot F$ is derived, in which $\ddot{x}_m \neq 0$ is obtained from $L_1 \neq L_2$. As a result, vibration due to $\ddot{x}_m$ is generated.

According to the present invention, as a result of the relationship $L_2 > L_1$, the relationship $F_B < F$ will be apparent. In other words, the weight of the balance shafts 16 can be reduced from that corresponding to conventionally required F to that corresponding to $F_B$ smaller than F. This makes it possible to accomplish a weight-reduction and a size-reduction of the balance shafts 16, thereby reducing a space required to install the balance shafts in the engine.

As apparent from the above, according to the present invention, by using the balance shafts 16 which generate their inertia force $F_B$ at the position separate by the distance $L_2$ from the center 18 of gravity of the power plant 13, the weight-lightening of the balance shafts 16 can be achieved without generating vertical vibration of the engine mount section 10 which vibration is caused by inertia force F generated by the engine, thereby improving fuel economy and power performance.

Particularly in this embodiment in which the balance shafts 16 are disposed inside the oil pan 15, the following effects can be obtained: As a result of the arrangement of $L_2 > L_1$, the balance shaft 16 are disposed forward (leftward in FIG. 1) in the engine 11 as compared with the conventional balancer system. Accordingly, location of the oil pan itself covering the balance shaft 16 can be shifted forward, thereby enlarging a space located rearward of the oil pan 15 installed to the cylinder block 14.

Additionally, the weight-lightening and accordingly the small-sizing of the balance shafts 16 leads to minimizing a space required for the balance shafts 16 inside the oil pan 15. This achieves small-sizing of the oil pan 15 itself, thereby further enlarging the space located rearward of the oil pan 15.

As shown in FIG. 1, an exhaust pipe 21, the member 22 of the vehicle body, and the like are disposed in the space located rearward of the oil pan 15. By enlarging this space, not only layout of the exhaust pipe 21, the vehicle body member 22, and the like can be facilitated, but also freedom in arranging such parts can be increased thereby facilitating disposition of such parts.

The entire contents of Japanese Patent Application P10-178717 (filed Jun. 25, 1998) which is the priority document upon which the disclosure of this application and its claim to priority are based, are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A balancer system for a power plant including
    a transversely mounted engine having an engine mount located on a first side in a direction of an axis of a crankshaft of said engine, said engine being supported through said engine mount to a vehicle body, and
    a transmission fastened to said engine at a second side opposite to the first side in the direction of the axis of the crankshaft,
    said balancer system comprising:
        a balance shaft which is rotatably installed to said engine;
        wherein a first distance between a center of gravity of power plant and a center of inertia force generated by the engine is smaller than a second distance between the center of gravity of the power plant and a center of inertia force generated by said balance shaft, each of the first and second distances being on a plane containing the axis of the crankshaft; and wherein an inertia force generated by said balance shaft is determined at a value which reduces vibration to a generally zero level at a support center of said engine mount section.

2. A balancer system as claimed in claim 1, wherein said engine includes an oil pan, wherein said balance shaft is disposed inside said oil pan.

3. A balancer system as claimed in claim 1, wherein said balance system includes first and second balance shafts which are located on opposite sides of a plane containing the axis of said crankshaft.

4. A balancer system for a power plant including a transversely mounted engine having an engine mount section located at a first side in the direction of an axis of a crankshaft, said engine being supported trough said engine mount to a vehicle body on which the power plant is mounted, and a transmission fastened to said engine at a second side opposite to the first side in the direction f the axis of the crankshaft, said balancer system comprising:

a balance shaft;

means locating the balance shaft in the engine for establishing a locational relationship that causes a first distance between a center of gravity of the power plant and a center of inertia force generated by the engine is smaller than a second distance between the center of gravity of the power plant and a center of inertia force generated by said balance shaft, each of the first and second distances being on plane containing the axis of the crankshaft; and for determining an inertia force generated by said balance shaft at a value which reduces vibration to a generally zero level at a support center of said engine mount section.

5. A balancer system for a power plant including a transversely mounted engine having an engine mount section located at a first side in a direction of an axis of an crankshaft, said engine being supported through said engine mount to a vehicle body on which the power plant is mounted, and a transmission fastened to said engine at a second side opposite to the first side in the direction of the axis of the crankshaft, said balancer system comprising:

a balance shaft which is rotatably installed to said engine;

wherein a first distance between center of gravity of the power plant and center of inertia force generated by the engine is smaller than a second distance between center of gravity of the power plant and center of inertia force generated by said balance shaft, each of the first and second distances being on a plane containing the axis of the crankshaft;

wherein an inertia force ($F_B$) generated by said balance shaft is given by the following equation:

$$F_B = [(I + m \cdot L_1 \cdot L_3)/(I + m \cdot L_2 \cdot L_3)] \cdot F$$

where F is an inertia force generated by said engine; $L_1$ is the first distance; $L_2$ is the second distance; $L_3$ is a third distance (on said plane) between the center of gravity of the power plant and a support center of the engine mount section; I is a moment of inertia of the power plant; and m is a mass of the power plant.

6. A power plant for an automotive vehicle, comprising a transversely mounted engine having an engine mount section located at a first side in a direction of an axis of an crankshaft, said engine being supported through said engine mount to a vehicle body on which the power plant is mounted;

a transmission fastened to said engine at a second side opposite to the first side in the direction of the axis of the crankshaft; and two balance shafts rotatably installed to said engine, said two balance shafts being located on opposite sides of a plane containing the axis of said crankshaft;

wherein a first distance between center of gravity of the power plant and center of inertia force generated by the engine is smaller than a second distance between center of gravity of the power plant and center of inertia force generated by said balance shafts, each of the first and second distances being on the plane containing the axis of the crankshaft;

wherein an inertia force generated by said balance shaft is determined at a value which reduces vibration to a generally zero level at a support center of said engine mount section, the vibration being caused by the inertia force generated by the engine;

wherein an inertia force ($F_B$) generated by said balance shaft is given by the following equation:

$$F_B = [(I + m \cdot L_1 \cdot L_3)/(I + m \cdot L_2 \cdot L_3)] \cdot F$$

where F is an inertia force generated by said engine; $L_1$ is the first distance; $L_2$ is the second distance; $L_3$ is a third distance (on said plane) between the center of gravity of the power plant and a support center of the engine mount section; I is a moment of inertia of the power plant; and m is a mass of the power plant.

7. A method of reducing vibration of a power plant including a transversely mounted engine having an engine mount section located at a first side in a direction of an axis of a crankshaft, said engine being supported through said engine mount so a vehicle body on which the power plant is mounted, and a transmission fastened to said engine at a second side opposite to the first side in a direction of the crankshaft, said method comprising:

installing a balance shaft in said engine so that a first distance between a center of gravity of the power plant and a center of inertia force generated by the engine has a value smaller than a second distance between a center of gravity of the power plant and a center of inertia force generated by said balance shaft, so that each of the first and second distances are on a plane containing the axis of the crankshaft, and so that an inertia force generated by said balance shaft has a value which reduces vibration to a generally zero level at said engine mount section.

8. A balancer system for a power plant including a transversely mounted engine having a crankshaft, an engine mount and a transmission, the power plant having a center of gravity which is separated from a first center of inertia force which is produced by at least one moving part of said engine by a first distance, comprising:

a balance shaft rotatably disposed in the engine so that the center of gravity of the power plant and a second center of inertia force generated by said balance shaft are separated by a second distance which is longer than the first distance, so that an axis of the crankshaft, the center of gravity of the power plant, the first center of inertia and the second center of inertia force line on a common plane, and so that said balance shaft produces an inertia force which attenuates vibration at the engine mount to an essentially zero level.

9. A balancer system as set forth in claim 8, wherein the center of gravity of the power plant is spaced from the engine mount by a third predetermined distance which is greater than the first and second distances and wherein the center of the inertia force produced by the balance shaft is located between and in a predetermined spatial relationship with the center of gravity of the power plant and the mount.

* * * * *